United States Patent Office.

GEORG WEGNER, OF BERLIN, GERMANY.

COMPOSITION FOR SOLDERING ALUMINUM.

SPECIFICATION forming part of Letters Patent No. 490,840, dated January 31, 1893.

Application filed April 20, 1892. Serial No. 429,853. (No specimens.)

*To all whom it may concern:*

Be it known that I, GEORG WEGNER, of Berlin, Germany, have invented a new and useful Improvement in Compositions for Soldering Aluminum; and I declare the following to be a full, clear, and exact description of the same.

Many attempts have been made to introduce an absolutely durable solder for aluminum, but as far as I am aware, without success, as no soldering alloy has yet been found, which will unite aluminum, as other metals are united. It has been suggested to use alloys made of ordinary solder, with the addition of zinc, but this alloy did not fulfill the requirements demanded for soldering, as it did not make so intimate a combination, as to be separated only by heating. It was also believed that the soldering could be effected by first coating the aluminum with a layer of another metal, but this coating failed to make a sufficient contact with the aluminum itself, and a hammer stroke on the soldered spot was sufficient to destroy the union.

By the present invention, I have succeeded in producing an alloy, which unites the pieces of aluminum directly with each other, and this union is so intimate, that it fulfills all the requirements of absolute and relative resistance, just as if the aluminum soldered together, consisted of one piece.

The alloy is made up of one hundred and sixty-five parts lead one hundred parts of English tin nine parts of zinc. Experiments on soldering aluminum with this alloy had the following practical results:—Two pieces of aluminum sheet of a suitable thickness and breadth, were soldered one over the other; and after soldering, spread out by hammering, without the solder union being loosened; the solder combination remained just as intimate as before the hammering, whereby its durability was convincingly proved.

The process of soldering is as follows:—The pieces of aluminum to be united, are first freed of all adhering particles of dirt, but without the use of files or emery, and upon the clean surface the solder alloy is applied, and by the use of a copper or wrought iron soldering iron, the immediate spreading of the solder is effected, so that the surfaces receive a coating as smooth as a mirror, fast adhering and not to be removed without heating; the thickness being regulated at will, care however being exercised, that the soldering iron shall not go beyond a red heat. The remnant of tin left on the iron after soldering, is removed with a file, never by stroking or by sal ammoniac.

It is well to assist the soldering by heating the aluminum because then the soldering iron is slower in giving off its heat. If the soldering is to be done in places where the soldering iron cannot be used, such as in corners, cylinders &c., then the aluminum is heated more, and the solder is applied to the spot with a red hot wire, in which case colophony can be used, in the known way, to spread the same.

The above described soldering process is applicable however, not only for aluminum alone, but also for soldering together aluminum with other metals.

In the soldering process, and the solder before described it must be especially mentioned that the solder can never become foamy.

I claim as my invention:)—

A composition to be used as a solder alloy for aluminum, consisting of one hundred and sixty-five parts lead, one hundred parts tin and nine parts of zinc as described.

In witness whereof I have hereunto set my hand in presence of two witnesses.

GEORG WEGNER.

Witnesses:
 W. HAUPT,
 R. BAYER.